TELEMETRY ARRANGEMENTS UTILIZING POWER DISTRIBUTING NETWORKS FOR MEASURING CONSUMPTION
Filed Jan. 9, 1967

INVENTORS
Alex Nyfeler
Alfred Spälti
BY Hansjörg Vonarburg
Morgan, Finnegan, Durham & Pine

United States Patent Office 3,508,243

Patented Apr. 21, 1970

3,508,243

TELEMETRY ARRANGEMENTS UTILIZING POWER DISTRIBUTING NETWORKS FOR MEASURING CONSUMPTION

Alex Nyfeler, Baar, Zug, Alfred Spalti, Zug, and Hansjorg Vonarburg, Lucerne, Switzerland, assignors to Electrometre S.A., Zug, Switzerland, a corporation of Switzerland Filed Jan. 9, 1967, Ser. No. 607,989

Claims priority, application Switzerland, Jan. 13, 1966, 460/66

Int. Cl. H04m *11/04*

U.S. Cl. 340—310 16 Claims

ABSTRACT OF THE DISCLOSURE

A telemetry system utilizing power distribution networks including a transmitter wherein a resonant circuit is periodically connected to the power distribution network thereby impressing bursts of audio signals on the power distribution network. The transmitter also includes circuitry responsive to a consumption meter wherein a switch is actuated each time a given quantity of the medium is consumed, and sampling circuitry which periodically interrogates the switch in order to detect a change in its state. The telemetry system also includes a receiver connected to the power distribution network which detects the bursts of audio signals by hetero dyning with a local signal and integrating the result.

A new technique has been developed to simply the method of ascertaining how much electricity, gas, water, heat and other such supplies have been distributed by utility companies to various consumers via long distance transmission networks. This technique assigns a measurement transmitter to each individual consumption meter or to groups of meters; the transmitter sends out reports on the consumption as measured at the consumption site by the meter, the reports being transmitted via a long distance channel to a central control station. If the long distance channel employs the electric supply network, the system is referred to as a consumption recording installation superimposed on the mains.

Applications of the assignee herein which disclose subject matter involving the system hereindescribed or related thereto include U.S. applications Ser. Nos. 607,988 (now Patent No. 3,454,910) and 607,987 (now Patent No. 3,444,489) of Alex Nyfeler, filed concurrently herewith and entitled, respectively, "Vibratory Switching Mechanism" and "Oscillatory Circuit With Vibratory Switch," and the following additional patents and applications owned by the assignee: U.S. Patent No. 3,221,926, issued Dec. 7, 1965, U.S. Ser. No. 552,638, filed May 24, 1966 (now Patent No. 3,385,472, issued May 28, 1968), U.S. Ser. No. 354,254, filed Mar. 24, 1964, U.S. Ser. No. 440,419, filed Mar. 17, 1965 (now Patent No. 3,406,075 issued Dec. 10, 1968).

In developing such telemetric installations it is possible to make use of some discoveries made in the field of circulating control (Rundsteuertechnik), although features of known circulation control arrangements cannot readily be transferred to the new technique; for in consumption recording installations, with the signals superimposed on the mains voltage, signals have to be supplied with maximum reliability from the numerous outermost points in an energy distributing network to a central station which collects the incoming information and passes it on for evaluation. One particular difficulty, using low output level measurement transmitters, which for reasons of economy are very simple in construction, is to generate and to superimpose on an AC network, signals of such a type that they can definitely be recognized at a distant place within the frequency spectrum of the network.

The measurement transmitter used in known installations of this type is an emitter which, by periodically connecting an electrical oscillatory circuit to the AC power network serving as the transmission channel, generates an audio frequency voltage in the form of an oscillation; this voltage produces audio frequency currents which spread through the entire mains complex and part of which pass to a specially tuned receiver which recognizes these currents as signals from the emitter and assigns them as a consumption report to a given consumption meter.

The consumption meters connected to a consumption recording installation have a two-way switch with two changeover contacts. Each time the consumption of a given quantity has been measured, the position of the two-way switch is changed by the counter of the consumption meter. In known circuit arrangements the nature of the audio frequency signal generated by the emitter depends on the position of the two-way switch. An image of this switch position is thus formed in the receiver, the position carrying a specific piece of information according to its timing.

The new technique of consumption recording utilizing signals superimposed on the mains voltage, is known to raise the problem of insuring that all the components operate extremely reliably. This is especially so in the case of the emitters which must be of very simple construction, completely free of maintenance requirements and nevertheless as durable as conventional meters. The fulfillment of these requirements creates considerable difficulties, the chief one being the problem of obtaining the desired simplicity. In view of the very large number of components to be installed in supply networks this, in the last resort, is the factor that decides whether such installations can be used on a large scale. A satisfactory solution to the problem would engender great advantages to the whole energy supply economy and in particular would allow a substantial saving in human labor.

It is recognized that means of this type as hitherto proposed, although operating in a very reliable manner, to some extent involve expenditures which are still undesirable in practice. It has been found however that by appropriately combining measures, some of which are known from other arts, decisive simplifications can be obtained in the whole transmitting system so that the requirements can now be fully met.

A system according to the invention has been developed which utilizes a consumption recording installation employing signals superimposed on the mains voltage. The system includes an emitter which is controlled by at least one consumption meter through the use of a two-way switch which, by periodically connecting an electrical series oscillatory circuit to an AC distributing network, superimposes audio frequency pulse signal voltages on the mains AC voltage. The system further comprises at least one receiver including filter means to select the audio frequency signal and a mixer stage to heterodyne it with an auxiliary frequency synchronously derived from the mains frequency. The arrangement thus develops an intermediate frequency and includes further mechanisms for filtering and evaluating this frequency.

The system according to the invention is further characterized in that the emitter has one feeler contact of the switch which is dimensioned and tuned so that a spectrum of switch harmonics relative to a switch fundamental wave is formed in the AC network, the frequency of the fundamental wave being lower than the mains frequency by a proportionality factor $p=2$. A synchronous selector assigns a given period of time within an emitting cycle to each changeover contact of the two-way switch. Furthermore, the frequency of the electrical series oscillatory circuit is at least approximately equal to that of a switch harmonic, and all the filter devices of the receiver have a transmission characteristic which is independent of any fluctuations in the mains or auxiliary frequency.

Further details of the invention are disclosed hereinafter in the examples which are described below with reference to the drawings. In the drawings.

Figures 1, 2, 3, 4, 5:
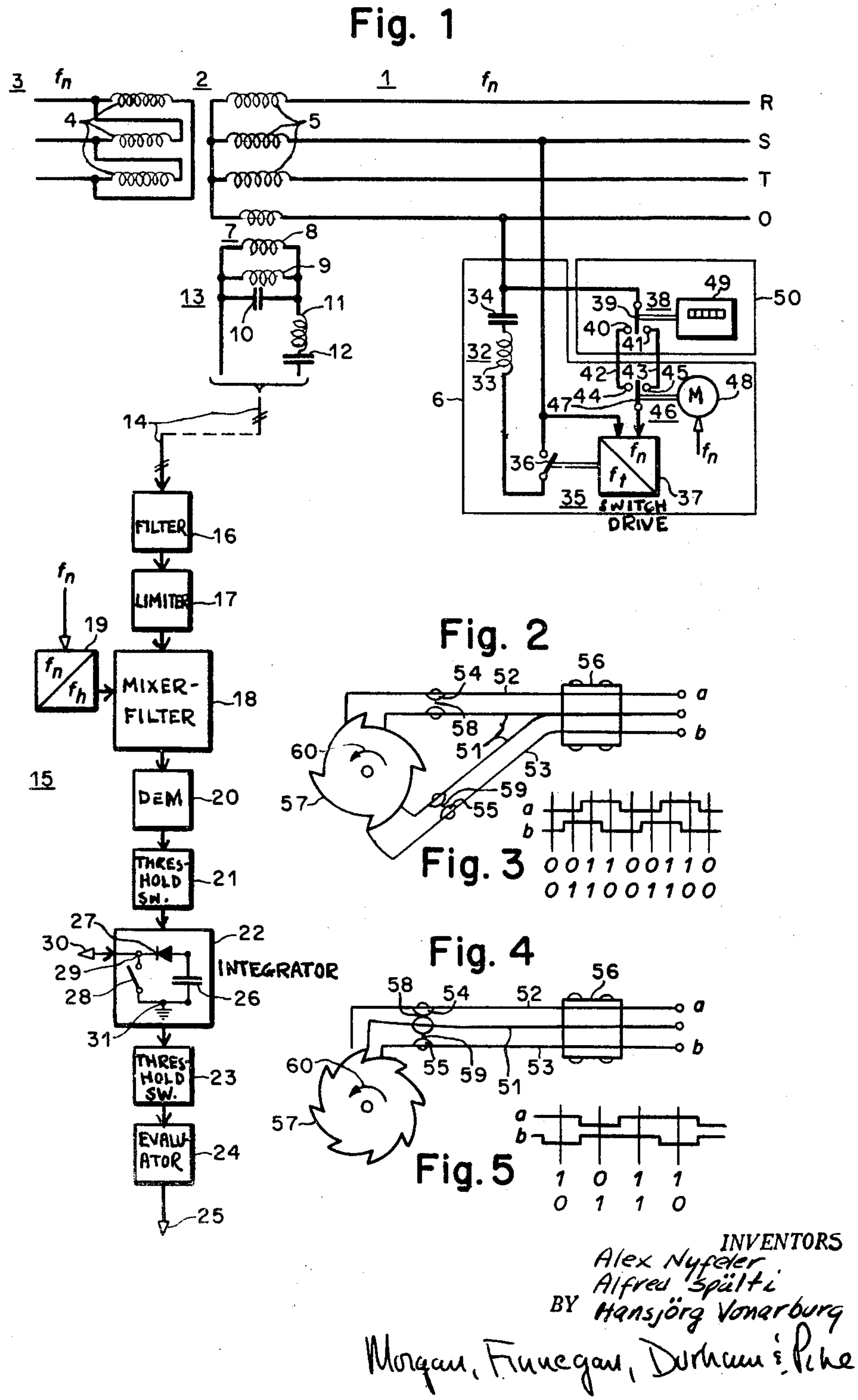
FIG. 1 is a schematic representation of a consumption recording installation in which the telemetry signals are superimposed on the mains voltage.
FIGS. 2 and 4 are schematic diagrams each showing a coding switch.
FIGS. 3 and 5 are both schematic timing diagrams.

In FIG. 1, the reference 1 refers to a low voltage distribution network for alternating current at a frequency $f_n$, for example a 50 c./s. three-phase four wire district network forming part of the utility electric supply and hereinafter referred to as the network or mains. The network 1 is fed from a medium voltage network 3 by way of a distributing transformer 2. The transformer 2 has primary voltage coils 4 and step-down voltage coils 5; the latter are generally arranged in a star connection and are in known manner coupled to phase leads R, S, T and a neutral lead O.

The network 1 is equipped with a consumption recording installation with the signals superimposed thereon. Transmitters 6 are provided at many points in the network 1, their single phase connections being between the neutral lead O and any of the phase leads R, S or T.

At the start or neutral point of the transformer 2 a current transformer 7 is coupled into the neutral lead O and its secondary coil 8 terminated by a parallel oscillatory circuit comprising a coil 9 and a capacitor 10. This circuit forms a Pi-input to a band pass half section network having a T-output, represented by a coil 11 and a capacitor 12. Parts 7 to 12 form a coupling network 13. As the most important interference currents occurring within the network 1 come within the low frequency region of the coupling network 13, the inductance of the coil 9 should advantageously be relatively low where the coil 9 has a high Q-factor. In addition the iron cross-section of the core of the coil 9 should be dimensioned so that the core is not saturated when the maximum possible interfering currents appear.

The coupling network 13 is connected by way of a two-pole lead 14, which may if necessary be a long distance lead such as a telephone line, to a receiver 15 represented in FIG. 1 in 1-pole block form. If the influence of the length of the lead 14, i.e. its inductance, is to be substantially eliminated, the inductance of the coil 11 must be high as compared with that of the lead 14.

The receiver 15 has an input band filter 16 to which the coupling network 13 forms an additional basic half section. The receiver 15 further contains an amplitude limiter 17 downstream of the input band filter 16 and, following the limiter 17, a mixing and filtering section 18, to the mixer stage of which an auxiliary frequency $f_h$, strictly proportional to the frequency $f_n$, is supplied from a frequency converter 19. The filter component of section 18 serves to filter the developed intermediate frequency and is followed by a demodulator 20, a threshold switch 21, and an integrator 22. A second threshold switch 23 and an evaluating stage 24 downstream thereof with an output unit 25, are supplied from one output of the integrator 22. The integrating capacitor 26 of the integrator is connected in parallel with a discharge switch 28 by way of a diode 27. A lead 30 branching off from a point 29 of the integrator depicts the possibility of electrically connecting several receivers 15 to switch 28 for the discharge thereof. It is desirable for the integrating circuit to be earthed at a point 31 as indicated. The band width of the filter section 18 is less than that of the input band filter 16.

The emitter 6 contains a series oscillatory circuit 32 comprising a coil 33 and a capacitor 34, together with a contact switch 35 having a feeler contact 36 and an impulse generator 37. The impulse frequency $f_t$ of the generator 37 determines the switching rate of the contact 36 and is derived from and proportional to the mains frequency.

The impulse generator 37 is fed directly from the network 1 via a two-way switch 38 having a contact arm 39 and two changeover contacts 40 and 41, each of which is connected by a lead 42 or 43 to one of the selector contacts 44 or 45. The contacts 44 and 45 are a part of a synchronous selector 46 of which the selecting arm 47 is connected in the energizing circuit of the impulse generator 37 and is driven by a synchronous motor 48. The two-way switch 38 is actuated by a counter 49 forming part of a consumption meter 50 which is indicated only in outline in the figure. It will be seen from FIG. 1 that parts 38 to 41 are arranged to be actuated by the counter 49 within the meter 50.

When a consumption report is to be transmitted, the synchronous motor 48 is energized by the voltage of the network 1 as indicated by the input $f_n$ to the motor 48. This may be accomplished, for example, by a circulated order. Through suitable selection of the speed transmission between the motor 48 and the selector arm 47, the latter can be made to remain for a given length of time, e.g. initially for approximately 3 seconds, on the selector contact 44 and then for approximately another 3 seconds on the selector contact 45. Depending on whether the contact arm 39 of the two-way switch 38 is in a neutral central position—as shown—or on one of the changeover contacts 40 or 41, the energizing circuit of the contact switch 35 will either be opened or will be closed during one of the two three-second intervals immediately following one another.

In the event the contact switch 35 is excited, its feeler contact 36 will, given the correct dimensions and tuning, close for about 10, 20 or 30 milliseconds, according to system design, at peak values of the mains AC voltage, e.g. every 40 milliseconds, each connecting surge resulting in transient oscillations in the series oscillatory circuit 32. In order to keep the suppression of these oscillations to a minimum, one should endeavor to obtain a high circuit Q in the circuit 32, an optimum value being about $Q=30$, since too narrow a resonance curve with too steep sides would allow changes in the mains impedance to have an unfavorable effect on the resonant condition of the circuit 32. In order to minimize the influence of changes in the mains impedance it is also advantageous to make the impedance of the series oscillatory circuit 32 large as compared with that of the network 1.

The frequency spectrum arising in the mains 1 as a result of the periodic coupling of the circuit 32 thereto substantially comprises a fundamental wave with contact period $f_t^{-1}$ and contact harmonics $c_i f_t$, varying in strength according to their proximity to the frequency of the circuit 32. In the present case the optimum value for the fundamental wave for the purpose of obtaining good emitting efficiency and a favorable frequency position has been found to be $f_t^{-1}=2(f_n^{-1})$. Furthermore, the frequency of circuit 32 should always be at least approximately equal to the frequency, $cf_t$, of a harmonic. Since the contact frequency $f_t$, which here is accordingly less than the mains frequency $f_o$ by a proportionality factor $p=2$, can be regarded as fixed as it follows only the normally very slight fluctuations of the mains frequency $f_n$, it will be appreciated that displacements in the resonance position of the circuit 32 should as far as possible avoid appreciable drop in the amplitudes of the harmonics which are essential to transmission. At a mains frequency $f_n$ of 50 c./s., particularly advantageous transmission conditions can be obtained at a contact frequency $f_t$ of 25 c./s. while making use of harmonics $cf_t$ of 425 or 575 c./s.; in this frequency position signals can be reliably transmitted with peak emitting currents of less than 2 amps. The auxiliary frequency $f_h$ should then desirably be 500 c./s.

Since in the emitter construction described above a given period of time within any one emitting cycle is assigned to each of the changeover contacts 40 and 41 of the two-way switch 38 by synchronous selector 46, this apparatus, unlike similar known consumption recording installations, can suffice with one feeler contact 36 and thus with one contact frequency $f_t$; this permits substantial simplification of the emitter 6 and receiver 15 and also provides optimum adaptation of the series oscillatory circuit 32 to the one contact frequency $cf_t$ used, thereby obtaining a very marked increase in emitting efficiency.

For the present purpose the technical design of the switch 35 is unimportant and only its size and tuning are pertinent. The feeler contact 36 and impulse generator 37 may be an electromechanical unit, e.g. an oscillating blade relay tuned to a sub-harmonic of the mains frequency $f_n$, or an electronic apparatus. See the above cited applications.

The arrangement shown in FIG. 1 is also advantageous in that the sensitive two-way switch 38, in contrast with known constructions, is no longer loaded with the current of the series oscillatory circuit 32.

The above mentioned simplifications in respect of the emitter and the provision of the particularly suitable transmission channels permit a substantial reduction in technical outlay on the receiving side also. Thus it is now possible for the audio frequency signals to be filtered out of the mixed frequencies in an AC distributing network in the receiver 15 solely by filter sections having a transmission curve which is independent of fluctuations in the mains frequency $f_n$ and the auxiliary frequency $f_h$. Thus, the filter components need not be automatically varied to accommodate changes in $f_n$ and $f_h$, as is done for example in the more complex and expensive correlation type filter. The simplification is aided by the fact that the audio frequency in the receiver is mixed with an auxiliary frequency $f_h$ strictly proportional to the mains frequency $f_n$ to form an intermediate frequency, the auxiliary frequency $f_h$ preferably being at least approximately equal to the arithmetical mean between contact harmonics, not immediately adjacent, and preferably being identical with a harmonic of the mains frequency $f_n$; the auxiliary frequency can then simply be derived from the mains frequency and if any change is made in the contact harmonic used for transmission all that is necessary is to retune the input band filter 16.

If the mains are subject to relatively frequent interference voltages having large portions within the frequency band passed by the filter 16, the provision of the limiter 17 may help to improve the insensitivity of the receiver 15 to such interference. It has been found particularly advantageous to include the threshold switch 21 (e.g. a Schmitt trigger) upstream of the integrator 22. The switch 21 responds only at a given threshold value of the output of the demodulator 20 and causes the integrating capacitor 26 to be charged with a constant current, i.e. a current independent of the amplitude of the signal voltage. The discharge switch 28 is provided for the rapid discharge of the integrating capacitor 26, thereby enabling a state of readiness to be re-established as soon as the signal has been evaluated, i.e. within a period of less than one second. The lead 30 may connect the integrating capacitors of other receivers to the discharge switch 28, only one such switch thus being required for several receivers. In order to prevent any reciprocal effect the diode 27 should be arranged in each receiver in the way shown in FIG. 1. This simplification is advantageous when the receivers for the various district networks are grouped in a central station, in which case the lead 14 is a long distance one.

The use of threshold switch 23, which may also be a Schmitt trigger, insures the rejection of integrated noise which does not develop an amplitude sufficient to trigger switch 23.

The result of integration manifested in the condition of switch 23 is further evaluated in data processing stages 24 which are generally downstream of the threshold switch 23. These provide the necessary updating of previous measurements. The information produced in the emitter 6 and other similar emitters can finally be picked up at the output unit 25.

It will be appreciated from the above explanation that the advantageous construction of the consumption recording installation with the signals superimposed on the mains voltage must depend on a series of features which are conditional upon one another if the required operating safety and simplicity are to be fully achieved.

To reduce the frequency of consumption measuring signals and thus substantially to lengthen the life of such installations it is proposed, as a further embodiment of the invention, that the two-way switch 38 of the consumption meter 50 should take the form of a coding switch. This increases the number of bits available for each measurement. A very appropriate and simple way of doing this can be seen from FIG. 2.

In FIG. 2, member 51 is a forked resilient contact arm replacing the contact arm 39 in the circuit of FIG. 1, while two contact members 54 and 55 mounted on contact springs 52 and 53 take the place of the changeover contacts 40 and 41 in FIG. 1. The contact arm 51 is held in an electrically insulated clamping block 56 together with contact springs 52 and 53 and is supported as shown on a single cam roller 57. Contact members 54 and 55 together with opposed contacts fixed on the arm 51 form changeover switches 58 and 59. When the roller 57 rotates in the direction of an arrow 60, a contact change takes place as shown in the circuit diagram in FIG. 3.

In FIG. 3, the letter *a* representing the top line of the diagram is assigned to the changeover switch 58 while the letter *b* referring to the bottom line is assigned to switch 59. Of the legends supplied in FIG. 3, 0 means that the contact is open and 1 that the contact is closed. The construction of the coding switch shown in FIG. 2 has the advantage that the spring forces exerted by the resilient contact arm 51 and the contact springs 52 and 53 substantially cancel one another out, so that the resultant axial pressure acting on the bearing for the roller 57 is small or non-existent.

Where it is desired to avoid the possibility of contact position 00 indicated in FIG. 1 involving the neutral position of the contact arm 39, the coding switch of FIG. 4 may be employed.

In FIG. 4, parts which are similar to those in FIG. 2 bear the same references. The way in which this modified switch operates is explained in the diagram in FIG. 5, to which the remarks referring to FIG. 3 also apply.

If the consumption reports are to provide information about load distribution and rating, it is desirable that the emitters in the installation constantly emit signals. In this case, the synchronous motor 48 should be left permanently connected and the emitting cycle in the network 1 will be repeated without any inactive interval. If the synchronization of the emitters should be disturbed by a temporary interruption of the voltage in a part of the network 1, it is sufficient to circulate an order about 0.5 second after the beginning of a normal emitting cycle so as to interrupt the transmission for a period equal to the duration of a complete emitting cycle less than 0.5 second; only the emitters which have dropped out of step will come to a standstill. In this way, the emitters can be synchronized with an adequate accuracy of 0.5 second without affecting the emitters in the undisturbed parts of the network, whose synchronous selectors 48 of course keep themselves energized immediately after the start. It is advisable for syncronization to be carried out periodically, at least once a day, in order that all the voltage interruptions not reported to the central station can be prevented from interfering with further recording of consumption.

In the practice and study of the invention, modifications will undoubtedly occur to those skilled in the art. The invention is thus not limited to the specific mechanisms and processes herein shown but departures may be made therefrom within the scope of the accompanying claims without departing from the principles of the invention and without sacrificing its chief advantages.

What is claimed is:

1. A system for the remote monitoring of medium consumption data measured by a consumption meter and utilizing telemetry signals superimposed on an AC power distribution network of operating frequency $f_n$, comprising:

a transmitter for superimposing bursts of audio oscillation on the distribution network including
- a resonant circuit,
- synchronous switching means periodically connecting said resonant circuit to the AC power distribution network to superimpose a burst of audio oscillation upon the power distribution network with each successive connection, said synchronous switching means operating at a frequency $f_t$ which has an integer ratio relationship to the operating frequency $f_n$, and
- said resonant circuit having a resonant frequency $cf_t$ which is a harmonic of said frequency $f_t$; and consumption responsive means including
- switch means connected to be actuated by the consumption meter, and
- sampling circuit means for periodically sampling said switch means and activating said synchronous switching means accordingly.

2. A system according to claim 1 wherein said resonant circuit is an LC circuit.

3. A system according to claim 1 wherein said synchronous switching means is an oscillating blade relay.

4. A system according to claim 1 wherein said resonant frequency $cf_t$ is a frequency other than a harmonic of the operating frequency $f_n$.

5. A system according to claim 1 wherein said switch means is a two position switch connected to be actuated by the consumption meter each time a predetermined quantity of said medium has been consumed.

6. A system according to claim 1 wherein said switch means connected to be actuated by the consumption meter in an encoding switch.

7. A system according to claim 6 wherein said encoding switch has three discrete states.

8. A system according to claim 1 wherein said resonant circuit has a Q of approximately 30.

9. A system according to claim 1 wherein said sampling circuit means includes a synchronous motor.

10 A system according to claim 1 wherein $$f_t=\frac{f_n}{2}$$

and said synchronous switching means connects said resonant circuit to the AC power distribution network for a period of time equal to $1/4f_t$.

11. A system according to claim 1 wherein $$f_t=\frac{f_n}{2}$$

and said synchronous switching means connects said resonant circuit to the AC power distribution network for a period of time equal to $3/4f_t$.

12. A system for the remote monitoring of medium consumption data measured by a consumption meter and utilizing telemetering signals superimposed on an AC power distribution network of operating frequency $f_n$, comprising:

a transmitter for superimposing bursts of audio oscillation on the distribution network including
- a resonant circuit;
- synchronous switching means for periodically connecting said resonant circuit to the AC power distribution network to superimpose a burst of audio oscillation upon the power distribution network with each successive connection, said synchronous switching means operating at a frequency $f_t$ which has an integer ratio relationship to the operating frequency $f_n$, and said resonant circuit having a resonant frequency $cf_t$ which is a harmonic of said frequency $f_t$;

consumption responsive means including
- switch means connected to be actuated by the consumption meter, and
- sampling circuit means for periodically sampling said switch means and activating said synchronous switching means accordingly; and a receiver responsive to said bursts of audio oscillation on the distribution network including
- means for deriving a heterodyning signal having a frequency $f_h$ which is a harmonic of the operating frequency $f_n$,
- mixer circuit means coupled to the distribution network and said means for deriving a heterodyning signal to mix received bursts of audio oscillation from said transmitter with said heterodyning signal to derive an intermediate frequency signal having a frequency independent of line frequency variations, and
- output circuit means responsive to said intermediate frequency signal.

13. A system according to claim 12 wherein said resonant frequency $cf_t$ is other than a harmonic of the operating frequency $f_n$.

14. A system for the remote monitoring of medium consumption data measured by a consumption meter and utilizing telemetering signals superimposed on an AC power distribution network of operating frequency $f_n$, comprising:

a transmitter for superimposing bursts of audio oscillation on the distribution network, including
- a resonant circuit,
- synchronous switching means for periodically connecting said resonant circuit to the AC power distribution network at a frequency $f_t$ which has an integer ratio relationship to the operating frequency $f_n$, and
- said resonant circuit having a resonant frequency $cf_t$ which is a harmonic of said frequency $f_t$;

consumption responsive means including
- switch means connected to be actuated by the consumption meter, and
- sampling circuit means for periodically sampling said switch means and activating said synchronous switching means accordingly; and a receiver responsive to said bursts of audio oscillation on the distribution network including
- filtering circuit means coupled to the AC distribution network and responsive to received bursts of said audio oscillation,
- rectification means connected to said filtering circuit means for providing a DC pulse corresponding to each received burst of audio oscillation,
- an integrator connected to said rectification means for accumulating applied DC pulses, and
- threshold circuit means coupled to the output of said integrator to detect when the accumulated output of said integrator reaches a predetermined level.

15. A system according to claim 14 wherein said threshold circuit means is a Schmitt trigger.

16. A system according to claim 14 wherein a threshold switch is connected between said rectification means and said integrator.

References Cited

UNITED STATES PATENTS

| | | | |
|---|---|---|---|
| 2,745,991 | 5/1956 | Seymour | 340—310 |
| 1,963,238 | 6/1934 | Koch | 325—342 |
| 2,327,251 | 8/1943 | Derr | 340—310 |
| 2,587,213 | 2/1952 | Polin | 340—310 |
| 2,961,642 | 11/1960 | Lamb | 328—127 |
| 3,011,128 | 11/1961 | Filipowsky | 328—127 |
| 3,104,382 | 9/1963 | Morgan et al. | 340—345 |
| 3,204,236 | 8/1965 | Duris et al. | 340—345 |
| 3,209,268 | 9/1965 | Fraunfelder et al. | 328—127 |
| 3,368,153 | 2/1968 | Garde | 307—246 |

THOMAS A. ROBINSON, Primary Examiner

U.S. Cl. X.R.

179—2; 340—206